US011635609B2

(12) United States Patent
Timmesfeld et al.

(10) Patent No.: US 11,635,609 B2
(45) Date of Patent: Apr. 25, 2023

(54) METHOD OF CONTROLLING IMAGING OF A SAMPLE BY A MICROSCOPE AND CORRESPONDING MICROSCOPE (71) Applicant: Leica Microsystems CMS GmbH, Wetzlar (DE)

(72) Inventors: Florian Timmesfeld, Marburg (DE); Oliver Keul, Nauborn (DE); Volker Schacht, Marburg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 17/238,233

(22) Filed: Apr. 23, 2021

(65) Prior Publication Data
US 2021/0333535 A1 Oct. 28, 2021

(30) Foreign Application Priority Data

Apr. 24, 2020 (EP) .................................... 20171398

(51) Int. Cl.
*G02B 21/36* (2006.01)
*G02B 21/06* (2006.01)
*H04N 23/74* (2023.01)
(52) U.S. Cl.
CPC ........... *G02B 21/365* (2013.01); *G02B 21/06* (2013.01); *H04N 23/74* (2023.01)
(58) Field of Classification Search
CPC .... G02B 21/365; G02B 21/06; G02B 21/241; G02B 21/26; G02B 21/16; H04N 5/2354
See application file for complete search history.

(56) References Cited

U.S. PATENT DOCUMENTS

| 2001/0030802 A1* | 10/2001 | Ooki ...................... G02B 21/06 359/368 |
| 2006/0273261 A1 | 12/2006 | Wolleschensky et al. |
| 2012/0293864 A1* | 11/2012 | Kawanabe ......... G01N 21/6458 359/388 |
| 2015/0185464 A1* | 7/2015 | Karube ................ H04N 13/275 348/44 |

FOREIGN PATENT DOCUMENTS

EP 2 328 009 A1 6/2011

* cited by examiner

*Primary Examiner* — John R Schnurr
(74) *Attorney, Agent, or Firm* — Leydig, Volt & Mayer, Ltd.

(57) ABSTRACT

A microscope includes a control system connected to an illumination system and an imaging system. The control system is configured to: detect an image affecting change in microscope settings and/or in a location of the sample, the image affecting change resulting in an alteration of the sample image; cause the imaging system to deliver a live image stream of live images of the sample in a first imaging mode, or to deliver a still image stream of still image(s) of the sample in a second imaging mode, and to switch from the first imaging mode into the second imaging mode when no image affecting change is detected, using one of the last live images of the first imaging mode for at least a part of the still image stream in the second imaging mode; and reduce an illumination intensity of the illumination system during the second imaging mode.

20 Claims, 3 Drawing Sheets

METHOD OF CONTROLLING IMAGING OF A SAMPLE BY A MICROSCOPE AND CORRESPONDING MICROSCOPE

CROSS-REFERENCE TO PRIOR APPLICATION

Priority is claimed to European Patent Application No. EP 20171398.9, filed on Apr. 24, 2020, the entire disclosure of which is hereby incorporated by reference herein.

FIELD

The present invention is directed to a microscope including a control system for controlling imaging of a sample imaged by said microscope, and to a corresponding method of controlling imaging of a sample imaged by a microscope, particularly in the field of microscopy of biological samples, like fluorescence microscopy of living samples like cells.

BACKGROUND

In the field of fluorescence microscopy for observing living samples, measures of precaution are taken, on the one hand, to protect the sample from ambient light and, on the other hand, to protect human eyes from directly observing fluorescence light emitted by the sample. To this end, current fluorescence microscopes have mechanisms to avoid exposing the specimen to direct sunlight or direct external light. Such mechanisms may include sample chambers which can be closed and sensors to detect whether they are closed or not. For protecting human observing eyes, modern microscopes may dispense with eyepieces, and the specimen is examined only via a digital camera. The microscope software usually provides a "live mode" where the live image of the camera is shown on the user's screen/display. For observation of a sample in the "live mode" the specimen needs to be illuminated by a powerful light source with a certain wavelength. Such illumination causes the fluorescence dye to emit a certain emission wavelength at sufficient intensity. However, this also causes a dye's degradation, and might also cause the specimen to decay. This effect is called dye and/or specimen "bleaching".

In order to minimize bleaching effects, live images are typically displayed at low illumination power and, at the same time, at high exposure times or high gain values of the microscope camera, which however causes a noisy, often blurry live image.

SUMMARY

In an embodiment, the present invention provides a microscope comprising a control system configured to control imaging of a sample imaged by the microscope, an illumination system configured to illuminate the sample and an imaging system configured to deliver microscopic images of the sample. The control system is connected to the illumination system and to the imaging system and is configured to: detect an image affecting change in microscope settings and/or in a location of the sample, the image affecting change resulting in an alteration of the sample image; cause the imaging system to either deliver a live image stream of live images of the sample in a first imaging mode, or to deliver a still image stream of one or more still images of the sample in a second imaging mode, and to switch from the first imaging mode into the second imaging mode when no image affecting change is detected, using one of the last live images of the first imaging mode for at least a part of the still image stream in the second imaging mode; and reduce an illumination intensity of the illumination system during the second imaging mode.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Embodiments of the present invention provide an improved method of controlling imaging of a sample imaged by a microscope, particularly a fluorescence microscope, and a corresponding microscope including a control system for controlling such imaging of a sample, particularly reducing the bleaching effects in fluorescence microscope imaging.

Embodiments of the present invention provide a microscope including a control system for controlling imaging of a sample imaged by said microscope, wherein said microscope comprises an illumination system for illuminating said sample and an imaging system for delivering microscopic images of said sample, said control system being connected to said illumination system and to said imaging system and being configured to detect an image affecting change in the microscope settings and/or in the location of the sample, which image affecting change results in an alteration of the sample image, and to cause the imaging system to either deliver a live image stream of live images of said sample in a first imaging mode, or to deliver a still image stream of one or more still images of said sample in a second imaging mode, and to switch from the first imaging mode into the second imaging mode when no image affecting change is detected, using one of the last live images of the first imaging mode for at least a part of the still image stream in the second imaging mode, and to reduce an illumination intensity of the illumination system during the second imaging mode.

An "image affecting change" is defined as any change in the microscope settings and/or any change in the location of the sample, which results in an alteration/change of the sample image as delivered by the imaging system of the microscope. In case such image affecting changes occur, it is desirable to show a live image of the sample on the display screen. In other words, image affecting changes result in visible changes in the microscopic image, like movements of the sample due to movements of the stage or of the focus drive, movements of a living specimen/sample, changes in illumination, like in light intensity or in light colour, or changes of image relevant camera parameters like exposure time or gain value. In the absence of such changes, it is sufficient to provide a still image to the user because the image would not change or only change slowly. Thus, instead of continuing providing a live image stream to the user, a still image of the sample is provided until an image affecting change is recognized. This, in turn, allows to reduce an illumination intensity or even to switch off the illumination during the period where still images are delivered to the user. With these measures, the present invention can significantly reduce bleaching and preserve the sample to be examined.

The term "still image stream of one or more still images" in the present application is defined to mean either an image stream of one single still image or an image stream of two or more still images where, e.g., from time to time, an actual live image is taken to refresh the stream of still images.

Upon switching from the first imaging mode to the second imaging mode, the last live image is particularly used as the still image to be presented to the user. However, in case the last live image is blurred, bad in contrast or otherwise of low quality, another one of the last live images of higher quality can be selected as the still image of the second imaging mode.

It is advantageous if the control system is further configured to cause the imaging system to switch from the second imaging mode (back) into the first imaging mode when an image affecting change is detected. At the same time, in the first imaging mode, the illumination intensity reduction of the second imaging mode can be dispensed with/removed/cancelled. After switching back to the first imaging mode, the control system is particularly configured to restore a previously set illumination intensity of the previous first imaging mode or to set an illumination intensity as currently requested by the user or by the system/software. Restoring the previously set illumination intensity of the previous first imaging mode makes sure that the user will not notice any brightness difference in the image such that the mode switching is performed smoothly. On the other hand, if the system/software/user requests a different illumination intensity, the imaging mode switches to the first imaging mode while setting the currently requested illumination intensity.

As already outlined above, image affecting changes particularly comprise at least one of the following: a movement of the sample itself, especially in case of living samples like cells, and/or a manipulation of the sample, a movement of a microscope stage holding the sample in relation to a microscope objective, such movements comprising movements of the stage in x-y-direction and movements of the stage or the objective in the z-direction through a focus drive, a change in illumination system parameters, like a change in illumination intensity/power or illumination colour/wavelength, a change in imaging system parameters, like exposure time, gain, frame rate and/or digital zoom of a camera used in the imaging system of the microscope, and a user input at a microscope user interface indicating an image affecting change, where the user can change any one of the above parameters or microscope components via a corresponding user interface, typically a GUI (Graphical User Interface).

The above image affecting changes are particularly detected by corresponding sensors located in or at the microscope stage (or associated components thereof), the microscope focus drive (or associated components thereof), the imaging system (camera) and/or illumination system (or associated components thereof), further by detection of a user's physical access to the sample, e.g. by corresponding sensors in or at the door or lid or opening providing access to the sample, further by the above user input indicating an image affecting change, and further by image analysis performed in the background based on live images of the sample showing a movement of the (living) sample, which can thus be detected by image analysis.

As already mentioned above, it is advantageous if the control system is configured to reduce, during the second image mode, the illumination intensity down to zero in order to optimally avoid bleaching. The illumination intensity can be reduced by reducing the illumination power and/or by using a shutter or filter or the like.

In another advantageous embodiment, during the second imaging mode, the control system is configured to turn off a camera of the imaging system or to keep the camera running without using the image stream of live images delivered by the camera. While turning off the camera can save power, it might be more advantageous to keep the camera running in order to be able to reactivate the live image stream as fast as possible when switching back to the first imaging mode.

In another particularly advantageous embodiment, in the second imaging mode, the control system is configured to cause the imaging system to take, after a preset period of time, an actual living image which is used for the following stream of still images in order to refresh the stream of still images. This measure is particularly suited in case of very slow changes in the microscopic image or in case of very slight changes after a period of time. In these cases, a timer can be activated to trigger a refresh of the presented still image stream, for example, in a predefined repetition rate (like every 10 seconds). This would still reduce bleaching while still showing a relatively current image.

In another embodiment, during the second imaging mode, the control system is configured to perform a predefined background operation.

Such a background operation/task performed during the second imaging mode, herein also called "virtual live mode", should not result in a switching back into the first imaging mode even if, for example, the microscope stage or the focus drive are moved. Thus, the user does not notice from the presented sample image that a background operation is performed.

Examples of such background operations are: a 3D scan of the sample, a determination of a focus map, usually done by autofocusing at a number of different x-y-locations, or a determination of the kind of surface or material of the sample. A determination of the kind of surface or of the material of the sample may be done by directing a measuring beam onto the sample and determining optical properties from the reflected beam, which give information on the kind of surface or material of the sample.

As already pointed out, such background operations/tasks can preferably be performed while a still image stream is presented to the user such that the user will not notice any movements of the sample and/or of the focus during the background operation. To this end, any changes in the setting of microscopic components (stage, focus drive, illumination settings, imaging/camera settings) necessary to perform the background operation are not rated/classified as "image affecting changes" in the sense of the present application. However, in case of an image affecting change which is not a result of a background operation, it is preferred to instantly interrupt the background operation and switch back to the first (live) imaging mode with reestablished microscope settings, as the previous x-y-z-position, the previous focus setting etc. Otherwise, the user would negatively recognize an image change or a time lag when restoring the live stream mode.

In another aspect, embodiments of the present invention provide a method of controlling imaging of a sample imaged by a microscope, wherein said microscope comprises an illumination system for illuminating said sample and an imaging system for delivering microscopic images of said sample, wherein an image affecting change in the microscope settings and/or in the location of the sample is detected by a control system, which image affecting change results in an alteration of the sample image, wherein, in a first imaging mode, a live image stream of live images of said sample is delivered by said imaging means, or, in a second imaging mode, a still image stream of one or more still images of said sample is delivered, and, when no image affecting change is detected, the first imaging mode is switched to the second imaging mode, using one of the last live images of the first imaging mode for at least a part of the still image stream in the second imaging mode, and wherein, during the second imaging mode, an illumination intensity of the illumination system is reduced.

Regarding a detailed description of the features and possible advantages of this method, reference is made to the corresponding features and advantages of the microscope according to embodiments of the present invention.

As used herein the term "and/or" includes any and all combinations of one or more of the associated listed items and may be abbreviated as "/".

Although some aspects are described herein in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Another aspect of embodiments of the present invention is directed to a computer program including program code for implementing the method according to embodiments of the present invention when said program is run on a processor, particularly on a processor of the control system of the microscope according to embodiments of the present invention. Further, an embodiment of the present invention is directed to a computer program product having such a computer program stored thereon.

Figure 1:
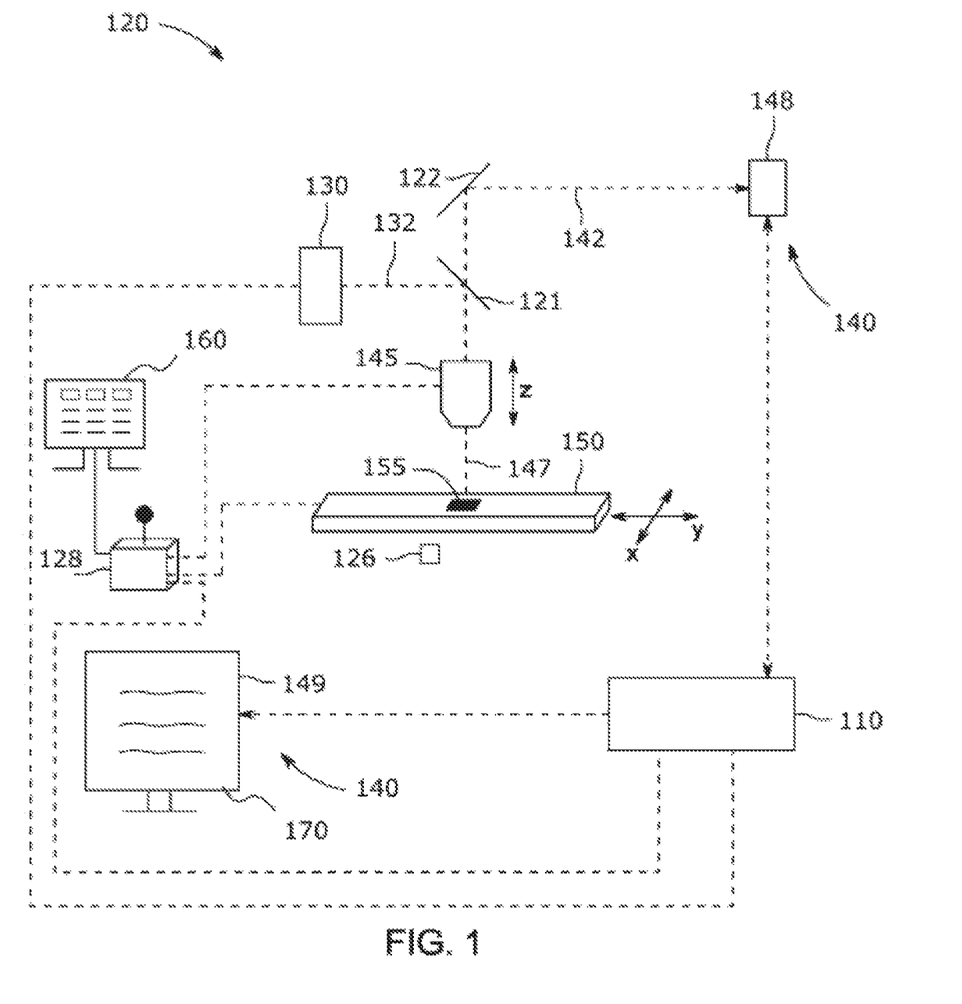
FIG. 1 schematically shows an incident light microscope according to an embodiment of the present invention, FIG. 2 schematically shows a display of the microscope of FIG. 1 in a time sequence for schematically illustrating the live image stream and the still image stream according to an embodiment of the present invention.

FIG. 1 schematically shows a microscope 120 in the form of an incident light microscope according to an embodiment of the present invention. It is noted that the present invention also applies to transmitted light microscopes since the present invention is not directly related to the kind of microscope. The microscope 120 comprises an illumination system 130, typically including an illumination source and a condenser lens for generating an illumination beam, the illumination beam path being designated 132. The microscope 120 further comprises a microscope stage 150 movable in the x-y-directions, both directions being perpendicular to an optical axis 147 defined by the microscope objective 145. The microscope objective 145 of this embodiment is movable in the z-direction (as illustrated by the arrow) and thus movable in the direction of the optical axis 147, implementing a focus drive. A sensor/encoder 126 is provided for detecting the position of the microscope stage 150 and/or of the objective 145, thus detecting any movement of a sample 155 on the microscope stage 150 in relation to the objective 145.

The microscope 120 further comprises an operating system 128 for operating/controlling movement of the microscope stage 150 and/or of the objective 145, which operation can be performed either manually by a user, typically using a user interface like a GUI 160, or automatically by a control system 110. Although operating system 128 and controller 110 are, for illustration purposes, depicted as separate entities, they can be combined or integrated into a single unit. Same applies to the GUI 160 and the display 149.

FIG. 1 further shows the sample 155 on the microscope stage 150, which sample 155 is illuminated by an illumination beam, in case of a fluorescence microscope the illumination beam having a specific wavelength range and intensity for excitation of fluorescence radiation in the sample 155. The illumination beam as well as the emitted fluorescence beam are conducted through the microscope objective 145. Typically, mirror 121 depicts a dichroic mirror which deflects excitation light and through which fluorescence light can pass through for imaging purposes. Light passing through the dichroic mirror 121 is used as observation light which is deflected by mirror 122 into an image detector 148. The corresponding observation beam path is designated 142. The imaging system 140 of the microscope 120 at least comprises the image detector 148, typically in the form of a camera, particularly a digital camera, and/or a display 149 for displaying microscope images 170 of the sample 155. The image detector 148 is configured to deliver a live image stream of live images of the sample 155, at least one of an exposure time, a frame rate, and a gain value of the image detector/camera 148 being adjustable. The corresponding image data is transferred to the control system 110 which transfers the image data, possibly after further image data processing, to the display 149 where images 170 are depicted in real time for observation by a user. Alternatively, the image detector/camera 148 can be directly connected with the display 149 for transmitting image data, and the control system 110 would then be connected to at least one of the components of the imaging system 140, i.e. the camera 148 and/or the display 149.

The control system 110 is configured to control the image detector/camera 148 and/or the display 149 to deliver a live image stream of live images of the sample 155 in a first imaging mode, the live images being taken with predetermined values of exposure time, frame rate and gain. Further, the control system 110 is configured to control the image detector/camera 148 and/or display 149 to deliver a still image stream of one or more still images of the sample 155 in a second imaging mode. Further, the control system 110 is configured to detect any movement of the sample 155 resulting from a movement of the microscope stage 150 in relation to the microscope objective 145 and/or as a result of a movement of the sample 155 itself.

A movement of the sample itself, especially of a living sample/cell, can be detected in different ways: At the beginning of the observation, a user may specify via the GUI whether the sample/specimen is fixed (i.e. cannot move) or alive (i.e. probably moves). In the latter case, from experience, the user might indicate a certain speed of movement. In case of a moving sample, the second imaging mode can be interrupted at certain intervals depending on a predetermined or the user-indicated speed of movement in order to provide an actual live image ("refreshing the stream of images"). If such indications of a possible movement and movement speed are not possible, the detection of movement can be accomplished by regular background tasks (as described before) in the form of image analysis of live images taken by the camera but not used for display to the user. Such an image analysis would, for example, compare the position of the sample in subsequent images and thus detect a movement.

Sensor/encoder 126 senses/detects relative movements of the microscope stage in relation to the microscope objective 145 and transmits corresponding signals to the control system 110. As discussed above, other sensors or methods can be provided to detect a movement of the sample itself, e.g., in case of living cells, or a manipulation of the sample 155 etc. Further, as the control system 110 is connected to the operating system 128 which particularly can be a user operating system, any user input can be detected by the control system 110. Same is true for any changes in illumination system parameters as the control system 110 is connected to the illumination system 130. Same is also true for any changes in imaging system parameters as the control system 110 is connected to the imaging system 140, here to the camera 148 and to the display 149. It should be noted that any changes in the imaging parameters, illumination parameters and any movements of the sample as described above can be initiated by a user of the system but also by a software controlling the microscope 120 typically used in case of automated microscopes. As such changes/movements normally affect/influence the image of the sample 155, the control system 110 is configured to cause the imaging system in form of the camera 148 and the display 149 to switch from the still image mode, i.e. the "virtual live image mode", where one or more still images of the sample 155 are delivered and displayed on the display 149, into the live image mode.

Without such image affecting change, in order to reduce "bleaching", the control system 110 is configured to cause the imaging system to switch to the "virtual live image mode". To this end, the last or one of the last live images is used as the still image of the still image stream. At the same time, the control system 110 causes the illumination system 130 to reduce an illumination intensity, particularly, the illumination intensity can be reduced down to zero to efficiently avoid bleaching. During the second imaging mode the camera 148 can either be turned off or kept running, however, without using the live image stream delivered by the camera. Instead, a still image is displayed on the display 149.

It is preferred to take an actual live image after a certain period of time, e.g., after five or ten seconds, after restoring the previously set illumination intensity, in order to refresh the still image stream by an updated live image which is then used as the still image of the still image stream. This is particularly advantageous in case of very slow changes in the sample image.

Figure 2:
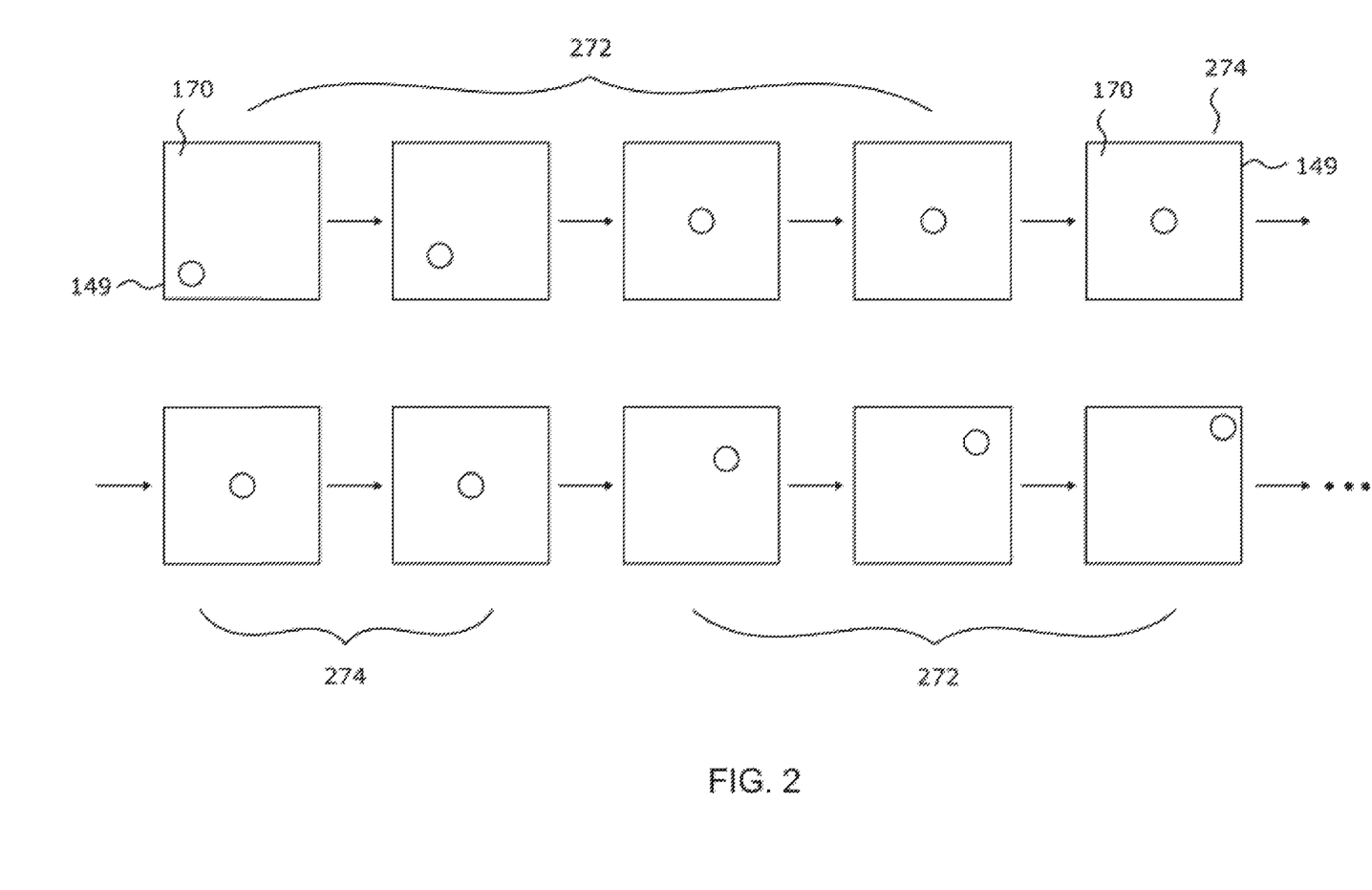

FIG. 2 schematically shows the display 149 of FIG. 1 displaying microscope images of the sample 155 in a time sequence. The first four images 170 belong to the first imaging mode where a live image stream 272 of live images is displayed. As the sample 155 moves in the first three images, the first imaging mode is active. In the fourth image 170 no such movement is detected. Therefore, the system switches to the second imaging mode and delivers a still image stream 274 by providing the same still image 170 on the display 149. The still image is the last image displayed in the live image stream 272. At the end of the still image stream 274, a movement of the sample 155 is detected. Thus, the system changes back to the first imaging mode and displays a live image stream 272.

In the following, further embodiments for "open" and "closed" microscopes are described in connection with FIG. 3.

"Open" microscopes are of a type where the user has physical access to the current specimen/sample. Thus, in absence of suitable sensors, the user can interfere with the specimen without the control system noticing it. In these cases, a possibility is needed to reactivate the live image stream, for example, when the user changes the specimen, or manipulates it directly. "Closed" microscopes are of a type where any access to the specimen is recognized by sensors. In these cases, the control system notices a user interference with the specimen and automatically switches to the live image mode, so that the user does not even need to know that an image mode switching feature became active.

In the above "closed" microscopes, any access openings are coded, that means software can determine whether the respective access opening is open or closed. Further, the microscope is equipped with a motorised focus drive and stage control, which are controlled either by software or by an input device (see operating system 128 in FIG. 1), which sends corresponding signals to the software. The software can be part of the control system 110 or communicate with the control system 110 of FIG. 1.

In such a "closed" microscope, the following "virtual" live image mode, i.e. second imaging mode, can be implemented: when the user activates the live image, the microscope operates like any other normal microscope with live mode. During live mode some changes of camera parameters might be done to adjust the brightness of the live image. This might be done by changing respective settings in the software manually or by some automatic exposure routines.

Figure 3:
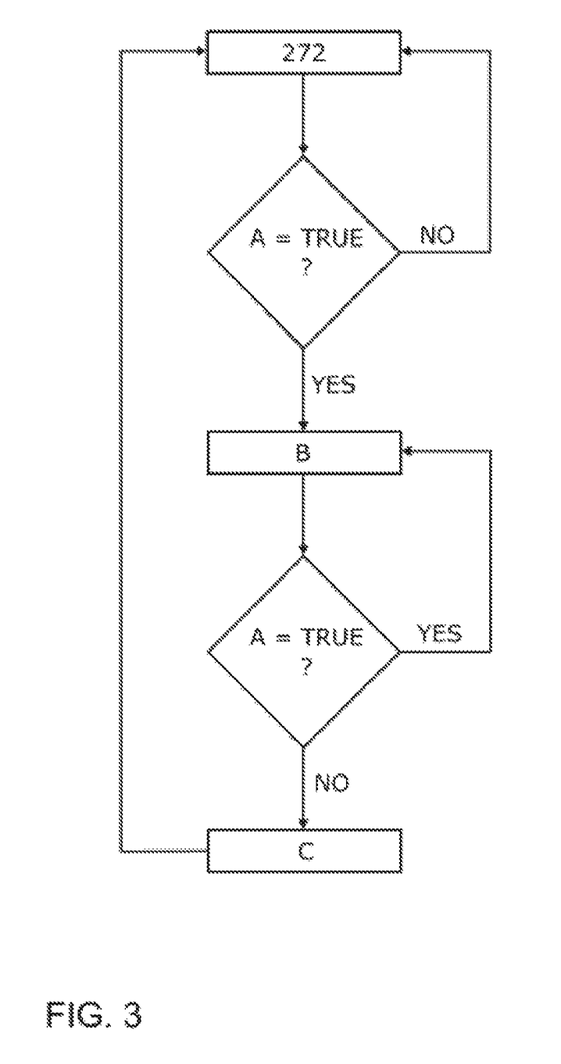
FIG. 3 shows a flow chart of an embodiment of a method according to the present invention.

As shown in FIG. 3, during the live image mode "272", if the software (of the control system 110 or in communication with the control system 110) detects that A=TRUE, where A= no change (be it manually or automatically) of camera or illumination parameters AND no change of focus AND no change of x-y-position of the microscope stage AND all physical access possibilities to the specimen are closed AND the specimen is not living, i.e. it cannot move by itself, then routine B is triggered:

the camera image 170 is saved and will be presented to the user as a "virtual" live image, although it is a still image, recognized by the user as a still image stream;

the camera 148 keeps running in the background but the live image stream delivered by the camera is not shown to the user any longer, in order to be able to reactivate the first imaging mode as fast as possible;

the light sources which illuminate the specimen are switched off.

IF A IS NOT TRUE, the imaging system 140 continues to deliver a live image stream 272.

After having triggered routine B, the software continues to detect whether A=TRUE. IF A IS NOT TRUE (e.g. the user moves the microscope stage 150 or operates the focus drive or opens the door to manually change the specimen etc.) then routine C is performed, namely the illumination is restored AND the live stream of the camera 148 is redirected to the display 149 for the user's view, i.e. the imaging system delivers the live image stream 272 to the user.

During the live image mode "272", the control system 110 continues to monitor condition A above in order to repeat the process described above.

In an "open" microscope where some but not all components are motorised/encoded and/or connected to a control system, one cannot safely tell whether and when a change/manipulation/movement of the specimen happens. In such microscopes, however, the "virtual" live mode can still be implemented. As many conditions (A) as possible are detected by the software/control system (depending on the motorised or encoded components). Further information can be collected through a user input. As soon as a user manually changes any microscope component/specimen or manipulates the specimen, the user can operate/click on a corresponding element in the user interface/GUI 160 to inform the control system 110 thereof. In this case, the control system 110 reactivates the live image stream.

The above software which is either part of the control system 110 or connected to the control system 110 represents the computer program for implementing the method according to the present invention.

FIG. 1 shows a schematic illustration of a control system 110 configured to perform a method described herein. The microscope 120 is configured to take images and is connected to the control system 110. The control system 110 is configured to execute at least a part of a method described herein. The control system 110 may be configured to execute a machine learning algorithm. The control system 110 and microscope 120 may be separate entities but can also be integrated together into one common housing. The control system 110 may be part of a central processing system of the microscope 120 and/or the control system 110 may be part of a subcomponent of the microscope 120, such as a sensor, an actor, a camera or an illumination unit, etc. of the microscope 120.

Control system 110 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The control system 110 may comprise any circuit or combination of circuits. In one embodiment, the control system 110 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor The, a field programmable gate array (FPGA), for example, of a microscope or a microscope component (e.g. camera) or any other type of processor or processing circuit. Other types of circuits that may be included in the control system 110 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The control system 110 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The control system 110 may also include a display device, one or more speakers, and a keyboard and/or controller, which can include a mouse, trackball, touch screen, voice-recognition device, or any other device that permits a system user to input information into and receive information from the control system 110.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 110 control system
120 microscope
121 dichroic mirror
122 mirror
126 encoder, sensor
128 operating system
130 illumination system
132 illumination beam path
140 imaging system
142 observation beam path
145 microscope objective
147 optical axis
148 image detector, camera
149 display
150 microscope stage
155 sample, specimen
160 user interface, GUI
170 microscope image
272 live image stream
274 still image stream

What is claimed is:

1. A microscope comprising:
    a control system configured to control imaging of a sample imaged by the microscope;
    an illumination system configured to illuminate the sample;
    an imaging system configured to deliver microscopic images of the sample; and
    an operating system configured to control movement of a microscope stage,
    wherein the control system is connected to the illumination system, to the imaging system, and to the operating system, and wherein the control system is configured to:
    detect an image affecting change in microscope settings that result in an alteration of the sample image, wherein detecting the image affecting change comprises receiving, directly from the operating system, user input indicating the movement of the microscope stage, which manipulates the sample;
    cause the imaging system to either deliver a live image stream of live images of the sample in a first imaging mode, or to deliver a still image stream of one or more still images of the sample in a second imaging mode, and to switch from the first imaging mode into the second imaging mode when no image affecting change is detected, using one of the last live images of the first imaging mode for at least a part of the still image stream in the second imaging mode;
    reduce an illumination intensity of the illumination system during the second imaging mode; and
    during the second imaging mode, perform a predefined background operation that requires an image affecting change in the microscope settings, wherein the control system is configured not to switch into the first imaging mode while the background operation is being performed.

2. The microscope according to claim 1, wherein the control system is further configured to cause the imaging system to switch from the second imaging mode into the first imaging mode when the image affecting change is detected, and, in the first imaging mode, to dispense with the illumination intensity reduction of the second imaging mode.

3. The microscope according to claim 1, wherein the control system is configured to reduce, during the second imaging mode, the illumination intensity down to zero.

4. The microscope according to claim 1, wherein, the control system is configured to reduce, during the second imaging mode, the illumination intensity by reducing illumination power.

5. The microscope according to claim 1, wherein, during the second imaging mode, the control system is configured to turn off a camera of the imaging system or to keep the camera running without using the image stream delivered by the camera.

6. The microscope according to claim 1, wherein, during the first imaging mode, after a change from the first to the second and back to the first imaging mode, the control system is configured to restore a previously set illumination intensity of the previous first imaging mode or to set a currently requested illumination intensity.

7. The microscope according to claim 1, wherein, in the second imaging mode, the control system is configured to cause the imaging system to take, after a preset period of time, an actual live image which is used for a following stream of still images in order to refresh the stream of still images.

8. The microscope according to claim 1, wherein the background operation is at least one of the following operations:
    a 3D scan of the sample;
    a determination of a focus map; and
    a determination of a kind of surface or material of the sample.

9. The microscope of claim 1, wherein detecting the image affecting change further comprises:
    detecting a change in illumination system parameters;

detecting a change in a parameter of the imaging system; or receiving a second user input indicating changing the illumination system parameter or the parameter of the imaging system.

10. The microscope of claim 9, wherein the illumination system parameter comprises a change in illumination power, illumination color, or illumination wavelength, and wherein the parameter of the imaging system comprises exposure time, gain, frame rate, or digital zoom.

11. A method of controlling imaging of a sample imaged by a microscope, wherein the microscope comprises an illumination system for illuminating the sample and an imaging system for delivering microscopic images of the sample, the method comprising:

detecting, by a control system, an image affecting change in microscope settings and/or in a location of the sample, the image affecting change resulting in an alteration of the sample image;

delivering, by the imaging system and in a first imaging mode, a live image stream of live images of the sample, or delivering, in a second imaging mode, a still image stream of one or more still images of the sample, and, when no image affecting change is detected, the first imaging mode is switched to the second imaging mode using one of the last live images of the first imaging mode for at least a part of the still image stream in the second imaging mode;

reducing, during the second imaging mode, an illumination intensity of the illumination system: and performing, during the second imaging mode, a predefined background operation that requires an image affecting change in the microscope settings and/or in the location of the sample, wherein the second imaging mode is not switched into the first imaging mode while the background operation is being performed.

12. The method of claim 11, wherein the imaging system is caused to switch from the second imaging mode into the first imaging mode when the image affecting change is detected, and, in the first imaging mode, to dispense with the illumination intensity reduction of the second imaging mode.

13. The method of claim 11, wherein, during the second imaging mode, the illumination intensity is reduced down to zero.

14. The method of claim 11, wherein, during the second imaging mode, the illumination intensity is reduced by reducing illumination power.

15. The method of claim 11, wherein, during the second imaging mode, a camera of the imaging system is turned off or kept running without using an image stream delivered by the camera.

16. The method of claim 11, wherein, during the first imaging mode, after a change from the first to the second and back to the first imaging mode, a previously set illumination intensity of the previous first imaging mode is restored or a currently requested illumination intensity is set.

17. The method of claim 11, wherein, in the second imaging mode, after a preset period of time, an actual live image is taken and used for a following still stream in order to refresh the stream of still images.

18. A tangible, non-transitory computer-readable medium having instructions thereon, which, upon execution by one or more processors provides for carrying out the method of claim 11.

19. A microscope comprising:

a control system configured to control imaging of a sample imaged by the microscope;

an illumination system configured to illuminate the sample; and an imaging system configured to deliver microscopic images of the sample, wherein the control system is connected to the illumination system and to the imaging system and is configured to:

detect an image affecting change in microscope settings and/or in a location of the sample, the image affecting change resulting in an alteration of the sample image, cause the imaging system to either deliver a live image stream of live images of the sample in a first imaging mode, or to deliver a still image stream of one or more still images of the sample in a second imaging mode, and to switch from the first imaging mode into the second imaging mode when no image affecting change is detected, using one of the last live images of the first imaging mode for at least a part of the still image stream in the second imaging mode, and reduce an illumination intensity of the illumination system during the second imaging mode, wherein, during the second imaging mode, the control system is configured to perform a predefined background operation that requires an image affecting change in the microscope settings and/or in the location of the sample, and the control system is configured not to switch into the first imaging mode while the background operation is being performed.

20. The microscope according to claim 19, wherein the background operation is at least one of the following operations:

a 3D scan of the sample;

a determination of a focus map; and a determination of a kind of surface or material of the sample.

* * * * *